United States Patent [19]

Colanzi

[11] 4,433,877
[45] Feb. 28, 1984

[54] SUPPORT ASSEMBLY FOR VEHICLE WHEELS

[75] Inventor: Franco Colanzi, Turin, Italy

[73] Assignee: RIV-SKF Officine Di Villar Perosa SpA, Turin, Italy

[21] Appl. No.: 349,703

[22] Filed: Feb. 18, 1982

[30] Foreign Application Priority Data

Feb. 27, 1981 [IT] Italy ............................ 67267 A/81

[51] Int. Cl.³ .................. F16C 19/08; F16C 33/60; F16D 1/06
[52] U.S. Cl. ................................. 308/191; 308/236; 403/259; 403/359; 411/161
[58] Field of Search .............. 308/189 R, 190, 191, 308/196, 208, 210, 236, ; 403/259, 298, 316, 318, 356, 359; 411/149, 160–163, 545

[56] References Cited

U.S. PATENT DOCUMENTS

| | | | |
|---|---|---|---|
| 1,922,929 | 8/1933 | Chaimberlain | 403/259 |
| 2,128,068 | 8/1938 | Anderson | 403/259 |
| 2,605,121 | 7/1952 | Ensinger | 403/259 |
| 2,675,044 | 4/1954 | Poupitch | 411/163 X |
| 2,730,387 | 1/1956 | White | 403/259 |
| 3,583,511 | 6/1971 | Asberg | 308/191 X |
| 4,047,770 | 9/1977 | Korenhof et al. | 308/191 |
| 4,306,466 | 12/1981 | Coveney | 403/259 X |
| 4,352,528 | 10/1982 | Guimbretiere | 308/236 X |

*Primary Examiner*—Stuart S. Levy
*Assistant Examiner*—David Werner
*Attorney, Agent, or Firm*—Shlesinger, Arkwright, Garvey & Fado

[57] ABSTRACT

A support assembly for a drive vehicle has an outer race for mounting to a suspension for the wheel and an inner race with a removable end section which carries an annular track for roller bodies supported in position therein by a spacer cage, the removable section being mounted on a journal to which it is nonrotatably and immovably fixed by a locking ring assembly which engages simultaneously end surfaces of both the journal and the inner race end section.

11 Claims, 7 Drawing Figures

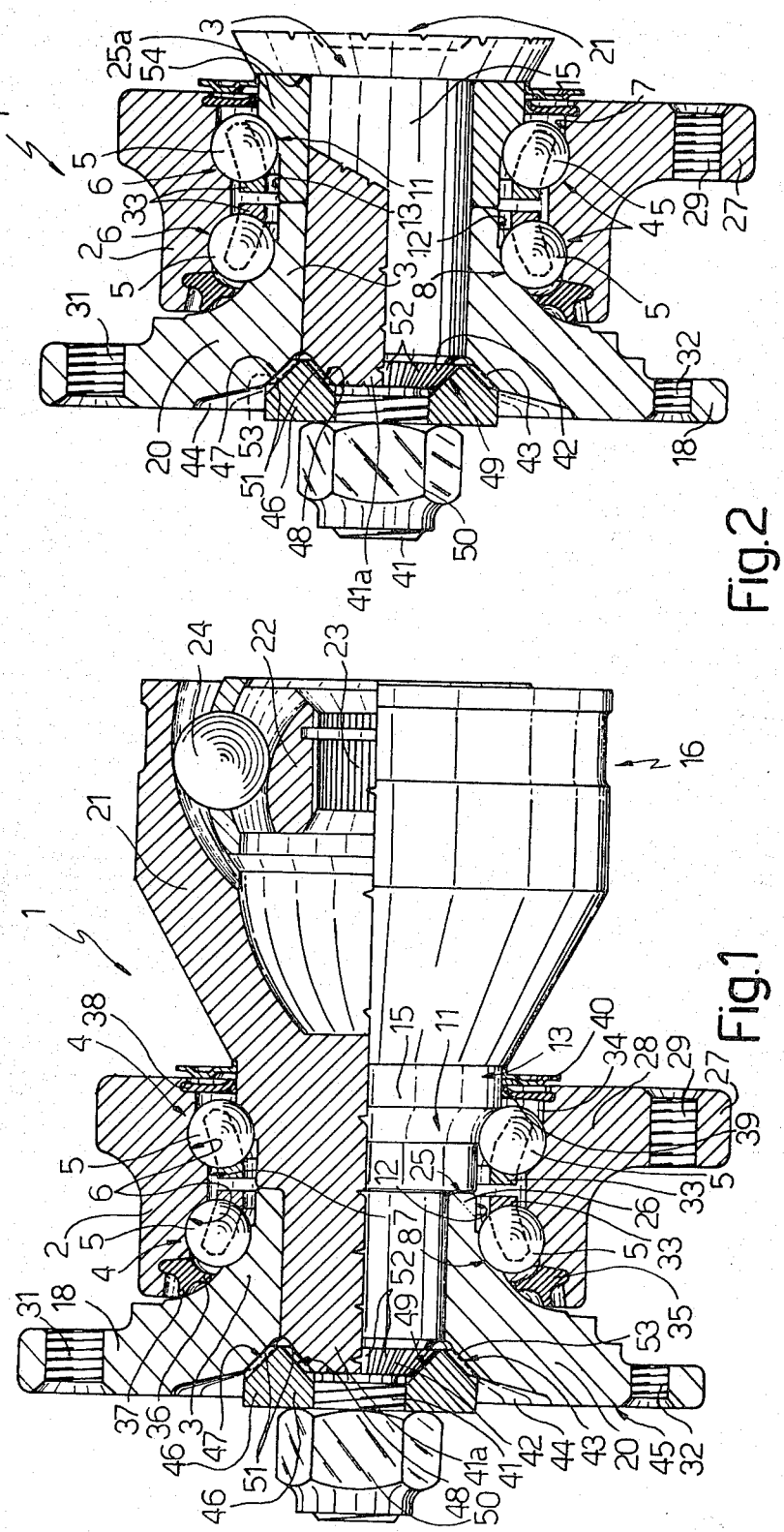

SUPPORT ASSEMBLY FOR VEHICLE WHEELS

BACKGROUND OF THE INVENTION

This invention relates to a support assembly for road vehicle wheels, and in particular to a support assembly for the drive wheels of motor vehicles.

A support assembly for motor vehicle wheels is known to usually comprise a hub for the wheels, a shaft, a spindle and a bearing with a structure which is very integrated with the rest of the mechanical members of the support, so as to reduce the number of necessary members and their weights, and to simplify the structure and construction of the wheel support assembly.

In a recent structural design, the rolling bearing of the drive wheels performs various functions, acting simultaneously as a hub for the wheels, as a bearing, as a shaft and as a spindle, by virtue of its special structure.

In this respect, the said bearing, which is usually of the mixed type consisting of two rows of oblique balls, comprises a substantially cylindrical inner race provided at one end with a flange for fixing to a vehicle wheel and with an inner surface in which a splined coupling is formed, and a substantially cylindrical outer race provided, at the opposite end to said end of the inner race, with a flange for fixing to the upright of a suspension for said wheel. The rolling bodies, slidable in suitable tracks, are disposed in the cavity lying between the inner race and outer race, and are isolated from the environment external to said cavity by means of known seal assemblies of the type consisting of a single or double sliding lip and a slinger shield, disposed between the inner race and outer race. By means of the splined coupling, the inner race is keyed on to a ball joint shaft, so enabling the torque to be transmitted to the wheel.

The described structural design is not without drawbacks. In particular, the need to transmit the torque from the ball joint to the wheel by way of the inner race of the bearing means that a very accurate splined coupling must be provided between the joint and the inner race, with consequent considerable machining difficulties and high cost. This is because very narrow tolerances are required, with perfect centering between the axis of the inner race and the axis of the splined coupling. In addition, the presence of the flanges on the opposite ends of the outer race and inner race makes it very difficult to insert the rolling bodies and to assemble the bearing, so making it necessary to limit the maximum number of rolling bodies which can be inserted. This means that the bearings must be over-sized in order to prevent overloading.

SUMMARY OF THE INVENTION

The object of the present invention is to provide a support assembly for vehicle drive wheels which is free from the aforesaid drawbacks.

This object is attained according to the present invention by a support assembly for a vehicle drive wheel, comprising at least one inner race provided with a fixing flange for said wheel, and an outer race provided with a flange for fixing to an upright of a suspension for said wheel, and two rows of rolling bodies disposed between said two races and arranged to roll on tracks of said races, said inner race being torsionally rigid with a ball joint element arranged to transmit motion to said wheel, characterized in that said joint element is provided with a journal having a cylindrical surface arranged to engage with the inner surface of said inner race, and by comprising a locking ring provided with teeth arranged to engage with a first set of cavities provided in an end portion of said journal and a second set of cavities provided in said inner race, and axial thrust means for said locking ring arranged to keep said teeth of said locking ring engaged with said cavities.

BRIEF DESCRIPTION OF THE DRAWINGS

The present invention will be more apparent from the description given by way of non-limiting example of a plurality of embodiments thereof with reference to the accompanying drawings, in which:

FIG. 1 is a longitudinal section through a support assembly constructed in accordance with the present invention;

FIGS. 2, 3 and 4 show modifications of the support assembly of FIG. 1;

DETAILED DESCRIPTION OF THE INVENTION

Figure 3:
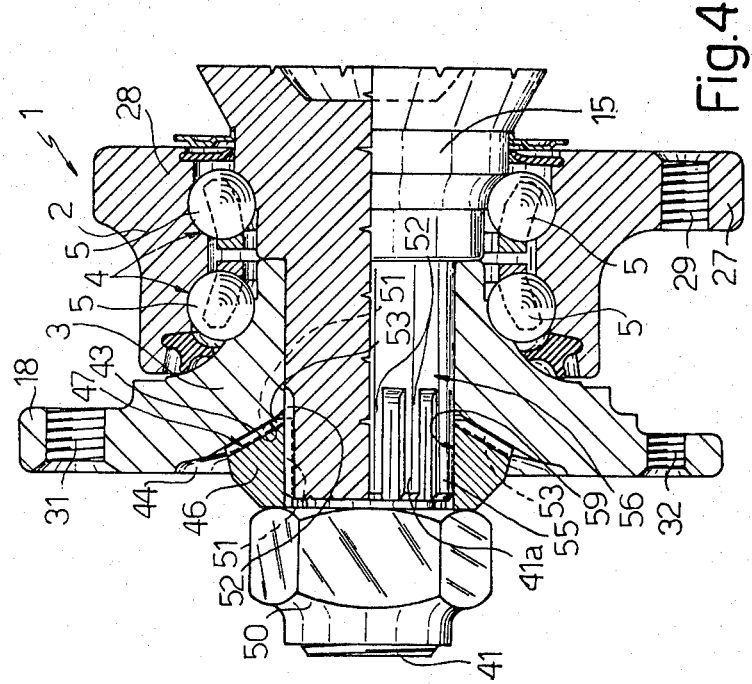

In FIG. 1, the reference numeral 1 indicates overall a support assembly for motor vehicle driving wheels, comprising an outer race 2, an inner race 3 and two rows 4 of balls 5 which roll between annular tracks 6 provided in the inner surface 7 of the outer race 2, and annular tracks 8 and 11 provided respectively in the outer surface 12 of the inner race 3 and in the outer surface 13 of a journal 15 pertaining to a ball joint 16 of known type. The tracks 6 are offset relative to the tracks 8 and 11, which are spaced apart by a distance greater than the distance between the tracks 6 of the outer race 2, such that the balls 5 can absorb both radial and axial loads. The first inner race 3 is provided with a flange 18 formed in one piece therewith at an end 20, and arranged to connect the race 3 to a vehicle wheel (not shown). The journal 15 is formed in one piece with an outer member 21 of the ball joint 16, which also comprises an inner member 22 housed in the member 21 and provided with a bore in which a splined coupling 23 is provided, and balls 24 disposed between the outer member 21 and inner member 22. The outer race 3 is slidably mounted over the journal 15 until it rests against a shoulder 25 of the journal 15 by way of that end 26 distant from the end 20.

The outer race 2 is also provided with a substantially quadrangular flange formed in one piece therewith on that end 28 facing the ball joint 16. The flange 27 is arranged to be connected to an upright of a suspension (not shown) by means of threaded bores 29 provided at the corners of the flange 26. The flange 18 also possesses a set of threaded bores 31 for its fixing to said wheel, not shown, and also possesses at least one threaded bore 32 for a reference pin, not shown.

The balls 5 of each row 4 are retained by a spacer cage 33, contained together with said balls 5 in an annular cavity 34 lying between the outer race 2 and inner race 3. The cavity 34 is closed at its ends by two seal assemblies of the known sliding lip type, so as to isolate the balls 5 from any contaminants external to the cavity 34, and to retain the necessary lubricant therein. On that end of the outer race 2 facing the flange 18 there is housed a double lip seal gasket 35, of which the radial annular lip 36 and axial annular lip 37 slide on the outer surface 12 of the race 3. At the opposite end 28 of the outer race 2 there is disposed a tight shield 38, of which the lip 39 slides on the surface 13 of the journal 15. A slinger shield 40 is also keyed on the journal 15 externally to the outer race 2, in a position facing the shield 38. The journal 15 has a threaded end 41, and an end portion 41a provided with a toothed frusto-conical surface 42, which is faced by a toothed frusto-conical surface 43 with internal toothing provided in a shallow recess 44 formed in the race 3 in the front surface 45 of the flange 18. On the threaded end 41 of the journal 15 there is also slidably mounted a locking ring 46 provided with an outer toothed frusto-conical surface 47 arranged to engage with the toothed surface 43, and with an inner toothed frusto-conical surface 48 provided in a shallow recess 49 in the ring 46, and arranged to engage with the toothed surface 42. The locking ring 46 is urged against the toothed surfaces 42 and 43 by means of a nut 50 which is screwed on to the threaded end 41 such that teeth 51 of the toothed surfaces 47 and 48 engage with cavities 52 and 53 of the toothed surfaces 42 and 43 respectively.

In operation, the support assembly 1 is disposed between the wheel and the axle shaft of a vehicle by fixing the flange 18 to the wheel, the flange 27 to the vehicle suspension upright, and the splined coupling 32 to the axle shaft. The torque is transmitted by the axle shaft to the wheel by way of the joint 16 followed by the flange 18 of the inner race 3 by virtue of the locking ring 46, of which the teeth 51 simultaneously engage the cavities 52 and 53 of the toothed surfaces 42 and 43 provided on the journal 15 and in the shallow recess 44 of the inner race 3.

FIG. 2 shows a modification of the support assembly of FIG. 1, in which the track 11 is not formed on the journal 15, but on a second inner race 54 slidably mounted on the journal 15 in a like manner to the first inner race 3. The races 3 and 54 are in this case locked axially by a shoulder 25a provided on one end of the outer member 21 of the joint 16. The nut 50 also locks both the races 3 and 54, and keeps the locking ring 46 engaged with the journal 15 and race 3. The remaining components of the support assembly 1 of FIG. 2 are completely identical to those already described, and are indicated by the same reference numerals.

Figure 4:
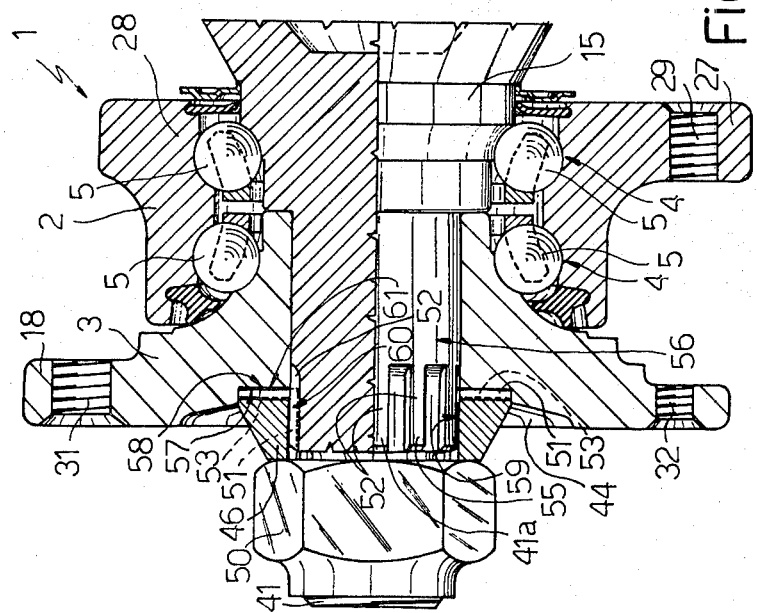

FIGS. 3 and 4 show two further modifications of the support assembly of FIG. 1, common parts being indicated by the same reference numerals.

The assembly 1 of FIG. 3 is similar to the already described assembly of FIG. 1, from which it differs only by the system for locking the race 3 on to the journal 15. In this respect, at the threaded end portion 41a, the journal 15 comprises a splined area 55 provided externally to the race 3 in the outer surface 56 of the journal 15. The race 3 comprises a toothed surface 57 with front toothing provided on the flat base wall 58 of the shallow recess 44 and substantially perpendicular to the axis of the journal 15. On the journal 15 there is slidably mounted a locking ring 46, of which the inner surface 59 comprises a splined area 60 arranged to engage with the splined area 55 of the journal 15. The ring 46 also comprises a front toothed surface 61 substantially perpendicular to the journal 15 and arranged to engage with the toothed surface 57 against which the ring 46 is urged by a nut 50 screwed on to the threaded end 41.

In operation, the teeth 51 of the splined area 60 and of the toothed surface 61 engage with the corresponding cavities 52 and 53 of the splined area 50 of the journal 15 and of the toothed surface 57 of the inner race 3 respectively, to transmit the drive torque from the journal 15 to the flange 18.

In the modification shown in FIG. 4, the journal 15 comprises on its end portion 41a a splined area 55 external to the race 3, and this latter comprises a frusto-conical toothed surface with internal toothing 43, facing the splined area 55 and provided on the shallow recess 44. The locking ring 46 is keyed on to the journal 15 by means of a splined area 60 provided in its inner surface 59 and engaged with the splined area 55, and comprises a frusto-conical toothed surface with external toothing 47 arranged to engage with the toothed surface 43 under the thrust of a nut 50 screwed on to the end 41. In operation, again in this case the teeth 51 of the ring 46 engaged in the corresponding cavities 52 and 53 of the splined area 55 and toothed surface 43 enable the drive torque to be transmitted from the journal 15 to the race 3 and then to the vehicle wheels.

Figure 6:
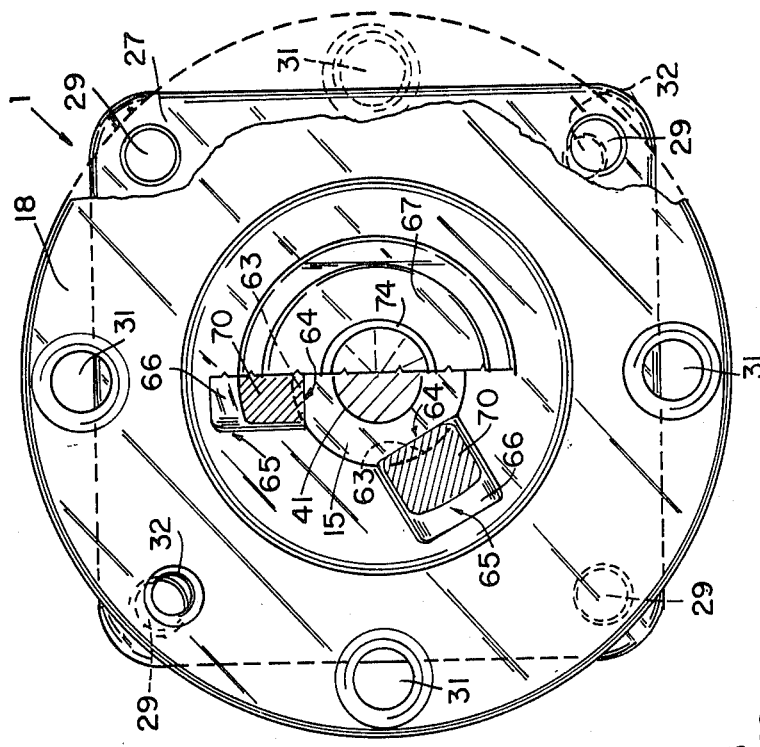
FIGS. 5 and 6 show respectively a longitudinal section and a section on the line VI—VI through a support structure in the form of a further modification of the embodiment of FIG. 1.
Figure 5:
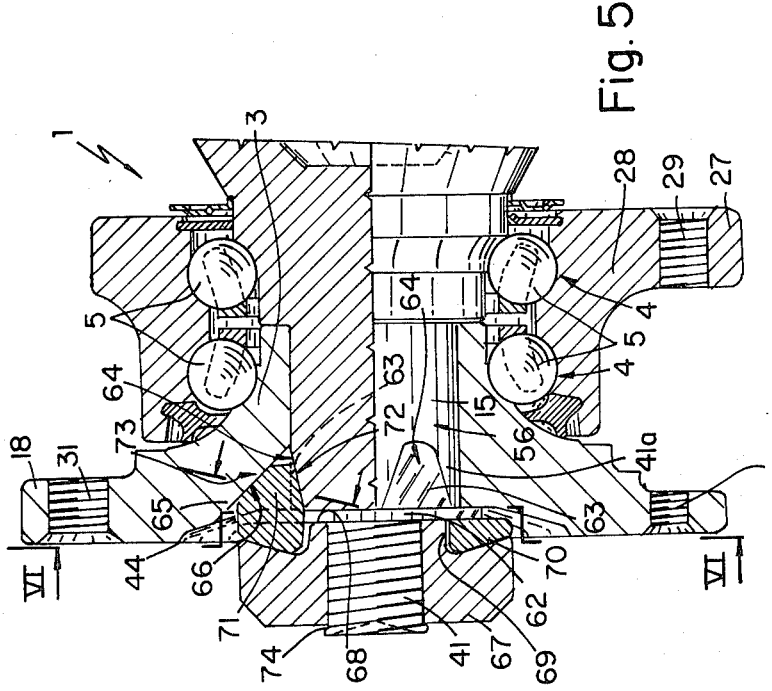

FIGS. 5 and 6 illustrate a further embodiment of the support assembly 1, in which the parts common to the embodiments already illustrated are indicated by the same reference numerals.

Figure 7:
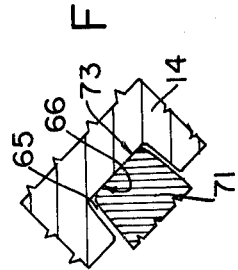
FIG. 7 is a partial section on the line VII—VII through the support assembly of FIG. 5.

The support assembly illustrated in FIGS. 5 and 6 is similar to the assemblies of FIGS. 1, 3 and 4, from which it differs by the manner in which the race 3 is locked to the journal 15. This latter possesses a threaded end 41 having an outer diameter less than that of the remainder of the journal 15, and bounded by a groove 62. In the outer surface 56 of the end portion 41a there are provided three equidistant cavities 63, each of which when viewed in plan is of substantially parabolic shape, and comprises a base surface 64 which is inclined to the axis of the journal 15. In a position facing the seats 63 there are provided, in a shallow recess 44 provided in the inner race 3, three equidistant cavities 65 comprising an inclined base wall 66 with its slope in the opposite direction to that of the surface 64, these having a substantially rectangular shape when viewed in cross-section (FIG. 7). On the threaded end 41 there is screwed a nut 67, in the front surface 68 of which there is provided a cavity 69 housing a locking ring 70 which tapers outwards and is provided with three substantially parallelepiped equidistant teeth 71 arranged to engage with the facing seats 63 and 65. In this respect, each tooth 71 is provided with two inclined surfaces 72 and 73 of opposite slope, arranged to adhere by friction to the corresponding inclined surfaces 64 and 66 of the facing seats 63 and 65 respectively. The ring 70 is urged by the nut 67 against the race 3 along the journal 15, so rigidly keying the former to the latter by virtue of the teeth 71 which behave as keys, to transmit the drive torque by friction. In order to prevent unscrewing of the nut 67 and thus a reduction in the extent of the friction engagement, the threaded end 41 is clinched over the nut 67 by means of a punch (not shown), in order to create a bulge 74 for locking the nut 67.

The advantages of the present invention are apparent from the description. In this respect, all the described embodiments enable the drive torque to be transmitted from the ball joint to the vehicle wheel without the presence of a splined coupling on the inner race of the support assembly, thus allowing considerable machining simplification and consequent cost reduction. Moreover, the structure of the wheel support assembly is even more integrated, with the ball joint simplifying its construction. Finally, the provision of inner tracks in different coupled parts simplifies the insertion of the rolling bodies, the number of which can be increased, so enabling higher loads to be supported for equal dimensions of the support assembly.

Finally, from the description it is apparent that modifications can be made to the illustrated embodiments of the present invention, without leaving the scope of the inventive idea. In particular, the embodiments illustrated in FIGS. 3, 4 and 5 can be modified in accordance with the embodiment of FIG. 2.

I claim:

1. A support assembly (1) for a vehicle drive wheel, comprising a dual track inner race provided with a removable inner race end section (3) which has a support flange (18) for said wheel and one annular track for a set of rolling bodies, a dual track outer race (2) facing the inner race and provided with a flange (27) adapted to engage an upright of a suspension for said wheel, a set of rolling bodies (4, 5) in each track, the rolling bodies of each set supported in place by an annular spacer cage disposed between said two races (23), the tracks (6, 8) of said races being longitudinally offset to accommodate both axial and radial loads, said removable inner race end section (3) being mounted on an element (21) which transmits motion to said wheel, the element having a journal section (15) with an end cylindrical surface (56) arranged to support a corresponding inner surface of the removable inner race end section (3) and a locking ring assembly (46, 50) for holding the removable inner race end section immovably in position on the journal, the outer end surfaces (42, 43) of the removable inner race end section (3) and the journal section (15) having gripping elements, and the locking ring assembly having interfitting elements (51) for simultaneously engaging the gripping elements of both the removable inner race end section and the journal whereby the removable inner race end section (3) can be readily installed and removed and held immovably in position on the journal by the locking ring assembly after mounting.

2. A support assembly (1) as set forth in claim 1, wherein said journal (15) of said element (21) has a rolling track (11) for the rolling bodies (5) of one of said rows (4), and a shoulder (25) for said movable inner race section (3) arranged to axially position said removable inner race section (3) relative to said track (11).

3. A support assembly (1) as set forth in claim 1, wherein the removable inner race end section (3) has an annular journal engaging surface which engages an annular shoulder (25) on the journal against which it is pressed by the axial thrust means, and the annular rolling body accommodating track is positioned on the external annular surface of the inner race end bearing member and has a curved contour to accommodate a portion of the periphery of the rolling bodies without restricting inner and outer movement of the removable inner race end section during assembly and disassembly thereof.

4. The support assembly for a vehicle drive wheel as set forth in claim 1, wherein the locking ring assembly (46, 50) includes an annular locking ring provided with teeth (51) which constitute the interfitting elements for fitting into cavities (52, 63, 53, 65) in both the end surfaces (41a) of said journal (15) and the removable inner race end section (3), and axial thrust means (50, 67) mounted on the journal behind the annular locking ring for pressing said locking ring (46) into engagement with the cavity surfaces (52, 63, 53, 65).

5. A support assembly (1) as claimed in claim 4, characterised in that said teeth (51) of said locking ring (46) pertain to an outer toothed conical surface (47) provided on said locking ring (46) and to a toothed conical surface with inner toothing (48) provided in a first shallow recess (49) of said locking ring (46), which are arranged to engage respectively with a first toothed conical surface (43) provided in a second shallow recess (44) formed in the front surface (45) of said inner race (3) and with a second toothed conical surface (42) provided on an end portion (41a) of said journal (15), said cavities (52, 53) pertaining to said first (43) and second (42) toothed conical surfaces.

6. A support assembly (1) as claimed in claim 4, characterised in that said inner race (3) is provided with a first plurality of equidistant cavities (63) comprising a first inclined base wall (64) arranged to engage by friction with said first inclined surface (72) of said teeth (71); said journal (15) being provided with a second plurality of cavities (65) facing the cavities (63) of said first plurality and comprising second inclined base wall (66) arranged to engage by friction with said second inclined surface (73) of said teeth (71).

7. A support assembly (1) as set forth in claim 4, wherein said journal has a threaded end (41), and the said axial thrust means is a nut (50, 67) screwed onto the threaded end (41) of the journal (15).

8. A support assembly (1) as set forth in claim 4, wherein the teeth on the locking ring are part of a splined area and both the end portions (41a) of the journal (15) and the end surface of the removable inner race end section (3) are also splined to provide for an interfitting of said elements.

9. A support assembly (1) as set forth in claim 4 wherein the forward engaging surface of the locking ring has teeth (71) substantially parallelepiped and equidistant, the teeth being provided with a first (72) and a second (73) inclined surface which taper toward each other at the free end of the tooth.

10. A support assembly (1) as set forth in claim 9, wherein the end face of the removable inner race end section (3) is provided with a first plurality of equidistant cavities (63) arranged to engage by friction with said first inclined surface (72) of said teeth (71) and the end portion (41a) of said journal (15) has a plurality of spaced cavities (65) matching equidistant cavities (73) which are inclined to receive and engage by friction the second inclined surface (73) of said teeth (71).

11. A support assembly (1) as set forth in claim 9, wherein the axial thrust means is a locking nut having a recessed area on its forward face (69) for engaging te rear face of the locking ring.

* * * * *